US010664922B1

(12) United States Patent
Madigan et al.

(10) Patent No.: US 10,664,922 B1
(45) Date of Patent: *May 26, 2020

(54) DATA HUB

(71) Applicant: Allstate Insurance Company, Northbrook, IL (US)

(72) Inventors: Regina Madigan, Mountain View, CA (US); Robert H. Johnson, Hoffman Estates, IL (US); Carolyn Parker, Libertyville, IL (US); Rothana Srey, Dekalb, IL (US); Nicholas A. Suizzo, Cody, WY (US); Sean P. Willett, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,425

(22) Filed: Dec. 14, 2018

Related U.S. Application Data

(63) Continuation of application No. 14/310,711, filed on Jun. 20, 2014, now Pat. No. 10,198,771.

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
CPC ........ G06Q 40/00; G06Q 40/08; G06Q 40/02; G06Q 40/04
See application file for complete search history.

(56) References Cited

U.S. PATENT DOCUMENTS

| 8,749,381 B1 | 6/2014 | Maroney et al. |
| 2002/0010599 A1 | 1/2002 | Levison |
| 2013/0144658 A1 | 6/2013 | Schnabolk et al. |
| 2014/0136242 A1 | 5/2014 | Weekes et al. |

OTHER PUBLICATIONS

May 26, 2017—(US) Non-Final Office Action—U.S. Appl. No. 14/310,711.
Nov. 1, 2017—(US) Final Office Action—U.S. Appl. No. 14/310,711.
Mar. 21, 2018—(US) Non-Final Office Action—U.S. Appl. No. 14/310,711.
Sep. 20, 2018—(US) Notice of Allowance—U.S. Appl. No. 14/310,711.
The Fire-Safe Home, The University of California, Berkeley Wellness Letter 6.n4: p4(2), Medizine LLC, Jan. 1990.

*Primary Examiner* — Lalita M Hamilton
(74) *Attorney, Agent, or Firm* — Banner & Witcoff, Ltd.

(57) ABSTRACT

Systems, methods, apparatuses and computer-readable media for receiving data from one or more sensors or devices associated with one or more users are presented. In some examples, data may be filtered and analyzed to determine a risk profile for a user. In addition, the system may also determine a neighborhood risk profile for a number of users located in the same geographical location. The risk profile and the neighborhood profile may be used to determine or adjust a user's insurance premiums.

21 Claims, 6 Drawing Sheets

US 10,664,922 B1

DATA HUB

CROSS REFERENCE TO RELATED APPLICATIONS

This application is a continuation of and claims priority to co-pending U.S. patent application Ser. No. 14/310,711, filed Jun. 20, 2014 and entitled "Data Hub," which is incorporated herein by reference in its entirety.

TECHNICAL FIELD

Aspects of the disclosure generally relate to monitoring and/or analyzing data associated with a user to assist in determining insurance rates for the user. In particular, various aspects described herein relate to receiving data from one or more computing devices, sensors, monitors, or third party devices associated with actions, activities, or transactions associated with the user to determine insurance rates or premiums, discounts, incentives, and the like.

BACKGROUND

People are often looking for ways to protect their assets. People buy insurance for exactly that reason—to protect against unforeseen risks. Without accurate information associated with a user an insurance company might not be able to accurately assess risk which may result in the user paying an insurance premium that is based on a generic risk assessment, rather than a risk assessment tailored to the user. This may result in the user paying higher or lower insurance premiums then an insurance premium based on a more accurate assessment of their specific risks.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for receiving data from one or more sensors associated with one or more home devices, such as appliances, home systems, etc. from at least one user's home. Additional behavioral or transactional type data regarding the user may also be received from the user's computing devices. In an aspect of the disclosure, the system may filter the received data based on privacy setting. The filtered data may be used to determine a risk profile and/or neighborhood risk profile which may be used to adjust insurance premiums. The risk profile may be generated based on the normal operating conditions of the home and other filtered data associated with the user.

In an embodiment, a neighborhood risk profile factor may be determined based on analysis of data from various outside sources or users located in the same geographical area. The outside sources of data may include police reports, alarm companies, governmental agencies, etc. The neighborhood risk profile may be used to set or adjust one or more insurance rates or premiums for users located in a particular neighborhood or zip code. For instance, a neighborhood risk profile may be used to more accurately assess risk associated with a home and may be used to adjust or determine an insurance rate or premium based on this assessed risk.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
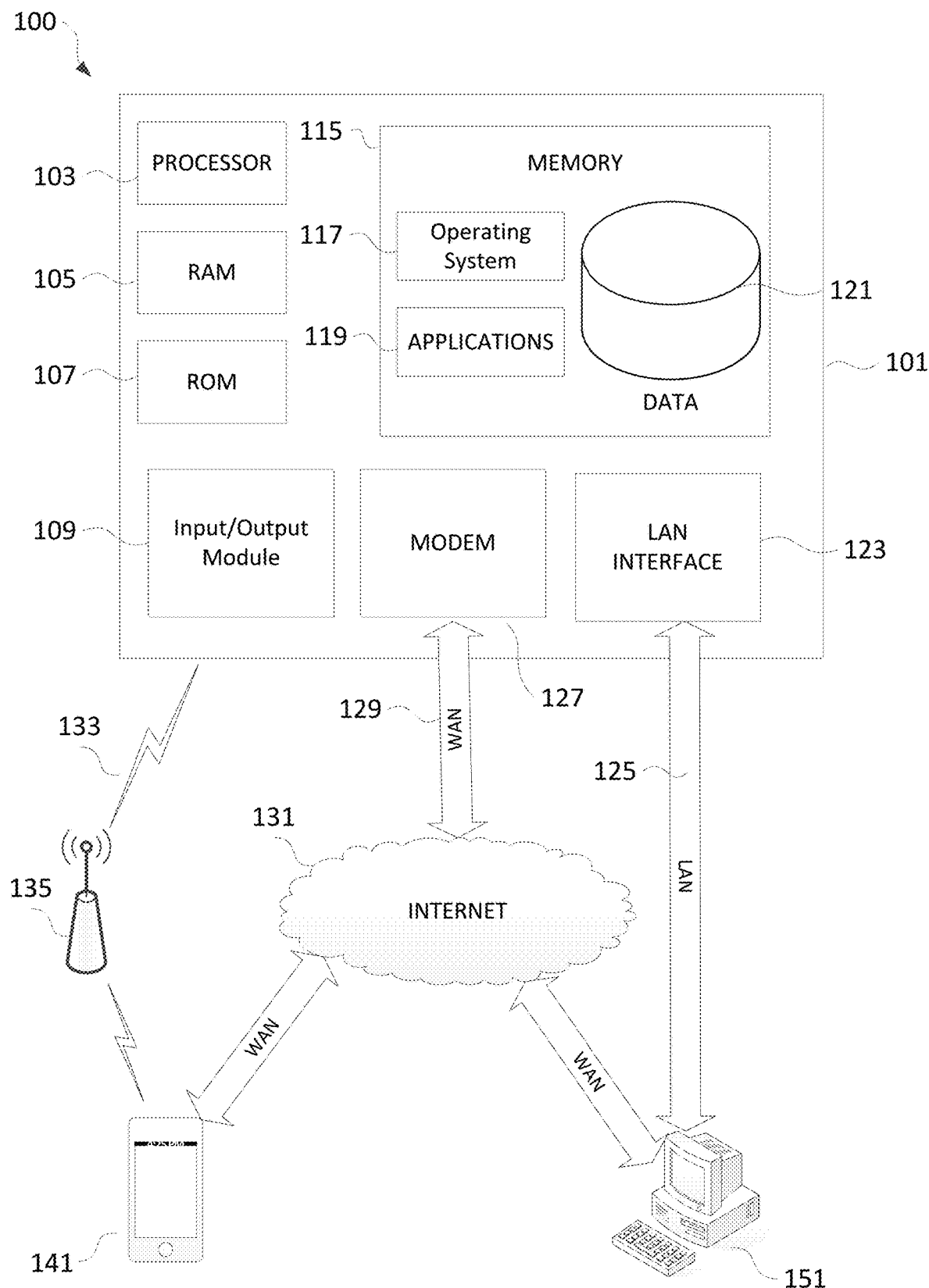
FIG. 1 illustrates a network environment and computing systems that may be used to implement aspects of the disclosure.

FIG. 1 illustrates a block diagram of a computing device 101 in communication system 100 that may be used according to one or more illustrative arrangements of the disclosure. The computing device 101 may have a processor 103 for controlling overall operation of the device 101 and its associated components, including RAM 105, ROM 107, input/output device 109, and memory 115. The computing device 101, along with one or more additional devices (e.g., terminals 141, 151) may correspond to any of multiple systems or devices, such as various servers or systems, such as a system or systems for sensing and/or monitoring aspects of one or more home devices, system or systems for determining a risk profile or neighbored risk profile, system or systems for sensing and/or monitoring aspects of a vehicle or driving habits, and the like, configured as described herein for receiving data associated with one or more home devices, one or more vehicles, one or more health or lifestyle aspects, etc., to determine whether the operation of these devices is within an acceptable range, identify any potential issues or failures, identify or adjust insurance rates based on the received data, provide insurance incentives for improvement based on the data, etc.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a home device, vehicle, lifestyle aspect, etc., determine one or more aspects of operation of the device and/or one or more overall aspects of a customer's lifestyle and/or provide insurance rates and/or incentives based on the data.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the sensing or monitoring system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, W-Wave, Zigbee and wireless mesh networks, is presumed, and the various computing devices and system components described herein may be configured to communicate using any of these network protocols or technologies.

Additionally, one or more application programs 119 used by the sensing system 101 may include computer-executable instructions (e.g., home device characteristic data analysis, risk profile data etc.) for receiving data associated with a home device of a user, analyzing the data to determine one or more aspects of the home device, and/or generating insurance rate, adjustment, incentive, etc. based on the data. Furthermore, one or more application programs 119 used by the sensing system 101 may include computer-readable instructions for determining a risk profile or neighborhood risk profile which may be used to adjust insurance premiums. The application program 119 may also be used to assist in preventing fraudulent claims.

Additionally or alternatively, one or more application programs 119 used by the sensing system 101 may include computer-executable instructions (e.g. home device, vehicle and/or lifestyle data analysis, etc.) for receiving data associated with one or more aspects of a home device of a user, one or more aspects of a vehicle and/or driving characteristics of the user, and/or one or more aspects of the lifestyle of the user. The data may, in some examples, be used to identify insurance rates, adjustments, incentives, and the like.

The systems described herein may be used by an insurance company, financial institution or other entity to monitor one or more home devices, vehicles, driving characteristics, lifestyle characteristics, etc. of a user. Although many examples herein will be described as being used in conjunction with an insurance company, the systems and methods described herein may be used by or with other entities or types of entities without departing from the invention.

Figure 2A:
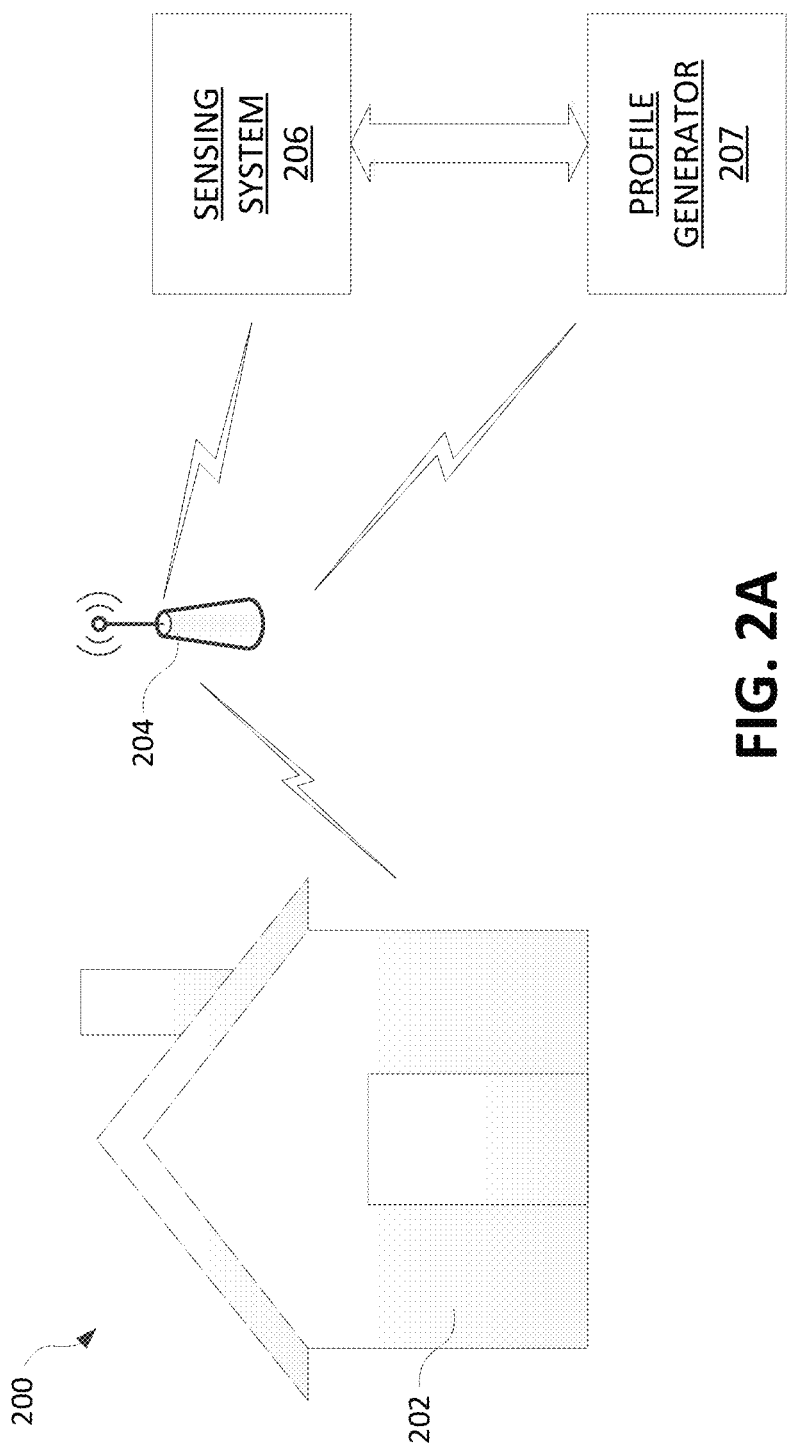
FIG. 2A is a schematic diagram of an example data collection system according to one or more aspects described herein.
Figure 2B:
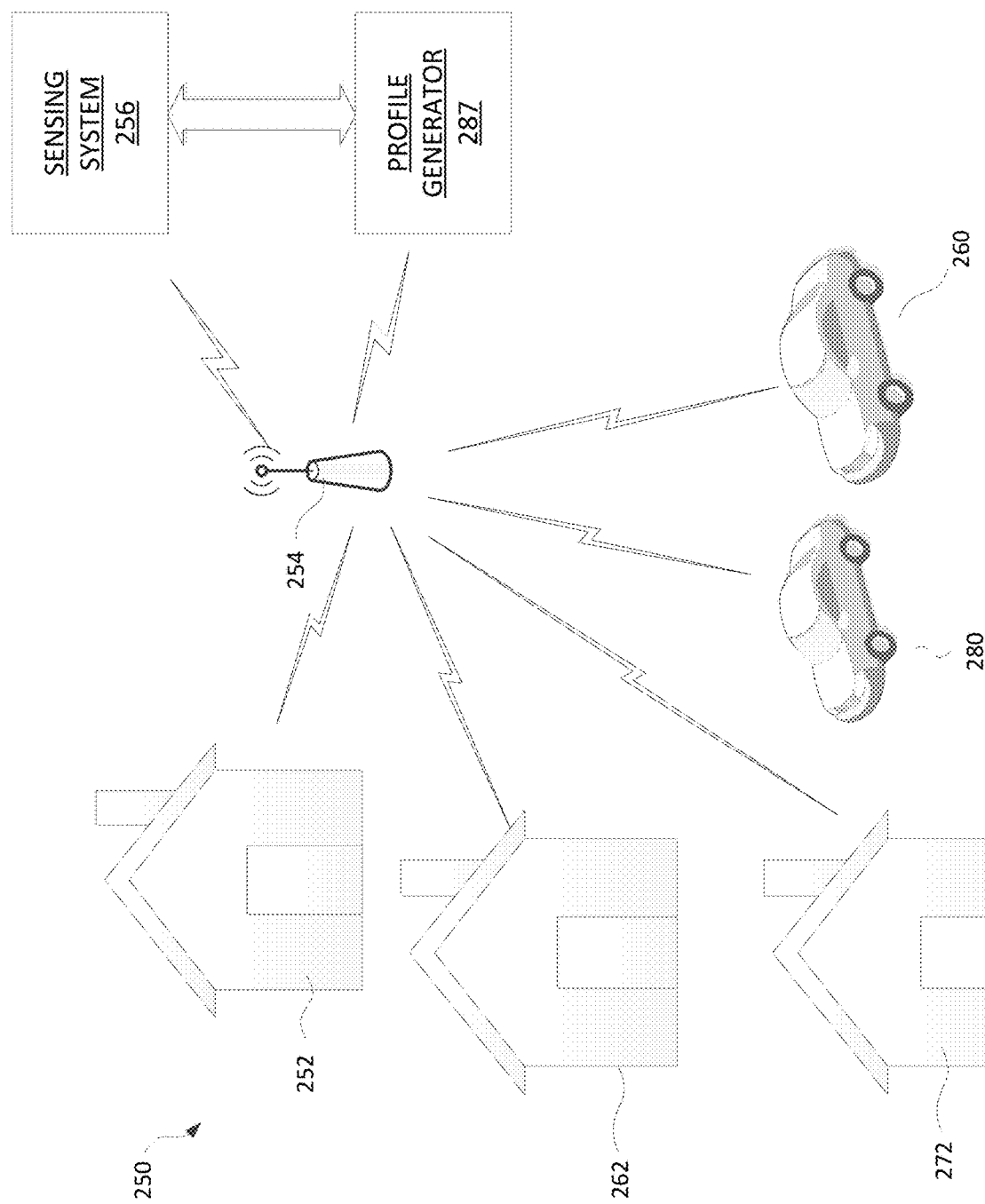
FIG. 2B is a schematic diagram of another example data collection system according to one or more aspects described herein.

In some arrangements, a sensing or monitoring system may be implemented by an entity. In some examples, the entity may be an insurance company. FIGS. 2A and 2B are schematic illustrations of sensing and/or monitoring system arrangements according to one or more aspects described herein. As shown in FIG. 2A, the arrangement 200 may include a home 202. The home generally includes a variety of systems, appliances, etc. that may be monitored by the sensing system described herein. For instance, one or more sensors or sensing devices may be arranged on or integrated into devices such as hot water heaters, refrigerators, washing machines, dryers, furnaces, air conditioning units, and the like. In some examples, sensors or other monitoring devices may be arranged on or integrated into paint, bricks or other building materials, and the like. Other home devices may include sensors or be monitored without departing from the invention.

In some examples, various types of sensors may be used with the sensing and/or monitoring system. For instance, power sensors, water sensors, heat or smoke sensing devices, and the like, may be used. In still other examples, "smart" materials may be used, such as smart paints, smart bricks, and the like, that may provide indications of wear or potential failure.

The home 202 depicted in FIG. 2A may include a plurality of appliances and/or systems and one or more of the appliances and/or systems (e.g., devices) may be monitored by one or more sensing devices, as will be described more fully below. Signals from the one or more sensing devices may be transmitted to the sensing system 206 at an entity, such as an insurance company. In some examples, the signals may be wirelessly transmitted and may be transmitted to a base collection unit 204 prior to transmission to the system 206. Alternatively, the signals may be transmitted directly to the system 206, e.g., via wired or wireless means. In some arrangements, the data may be collected in real-time and/or transmitted in real-time or near real-time. Additionally or alternatively, the data may be collected and/or transmitted in batches.

In an aspect of the disclosure, sensing system 206 may log the time of day that events occur such as the time lights are turned on, doors are opened and closed, and the like. In addition, sensing system 206 may log activation times of appliances such as logging the starting time of an oven, stove or dishwasher. The time the appliance turns off may also be logged such that a duration time may be calculated for each appliance. In an embodiment, sensing system 206 may also log the opening and closing of doors or windows and the activation of security systems or the like.

In an aspect of the disclosure, sensing system 206 may transmit the stored information to profile generator 207 to determine a risk profile for home 202. The determined risk profile may include typical operations of home 202 such as appliance use, opening and closing of doors and windows, and activation of lights. In an embodiment, profile generator 207 may analyze data from the various home sensing devices. Profile generator 207 may determine based on analysis of hours or days of sensor data normal usage patterns for the home and/or the appliances found in the home. The determined normal usage patterns for the home may be used to generate a risk profile for the home.

In an embodiment, a risk profile may comprise a series of scores. The risk profile may be determined based on losses associated with various perils. In an embodiment, various perils that may be scored include fire, brush fire, weather water, non-weather water, liability, theft, wind, hail, lightning, hurricane, and a miscellaneous category which captures new or risks not categorized above. Those skilled in the art will realize that additional categories or grouping of perils may be added based on property location or other external factors. In an embodiment, sensor data may be tied to various peril categories for which losses may occur. For example, use or non-use of an alarm system may be used to determine losses or potential losses for the theft peril. In another embodiment, sensors measuring appliance and/or utility usage may be used to determine losses or potential losses for the fire or water peril. Those skilled in the art will realize that sensor data from each monitored device may be applied to multiple different perils.

In an aspect of the disclosure, factors may be determined for each of the peril categories based at least in part on sensor data and/or normal operating conditions of the home. In an embodiment, the risk profile may comprise a series of scores based one the calculated factors. The calculated risk profile may be applied to each of the peril categories to determine an insurance premium rate.

In an embodiment, a risk profile may comprise an overall rating score. The overall rating score may be determined at least in part by the number of sensors located in the home and the number of sensor activations. The risk profile may also comprise, in part, the determined normal operating conditions of the home. In an embodiment, the risk profile may be calculated along a sliding scale ranging in one embodiment between zero and five hundred. Those skilled in the art will realize that numerous other sliding scales with various ranges may also be used. In an embodiment, the risk profile may be applied to each of the peril categories to determine an insurance premium rate. In another embodiment, the risk profile may apply differently to each of the various perils to determine an insurance premium rate.

In an embodiment, the determined risk profile for the home may be used for determining an insurance premium rate for the home. In an aspect of the disclosure, the determined risk profile may be updated at some frequency by automatic review of new sensor data over a specified time period.

In another aspect of the disclosure, sensing system 206 may transmit the stored information to profile generator 207 to determine various behavioral models of home usage habits. The behavioral models may be used to determine purchase behavior, utilities utilizations rates, household content current and future values, etc. The data may enhance insurance risk models.

FIG. 2B illustrates another example sensing arrangement 250. Similar to the arrangement of FIG. 2A, the arrangement 250 of FIG. 2B includes a home 252 that may include a plurality of appliances and/or systems that may be monitored by one or more sensing devices. In addition, the arrangement 252 may include a vehicle 260. The vehicle 260 may include one or more sensing devices configured to monitor driving habits of a user. The data associated with the vehicle 260 may be transmitted to a sensing system 256, e.g., via wired or wireless communications. For instance, vehicle 260 may include one or more cameras and proximity sensors capable of recording additional conditions inside or outside of the vehicle. Internal cameras may detect conditions such as the number of the passengers in the vehicle and potential sources of driver distraction within the vehicle (e.g., pets, phone usage, unsecured objects in the vehicle). External cameras and proximity sensors may detect other nearby vehicles, traffic levels, road conditions, traffic obstructions, animals, cyclists, pedestrians, and other conditions that may factor into a driving event data analysis. The external cameras and sensors may also be used to detect ambient conditions or weather events when parked such as in a home driveway. In addition, the vehicle sensors may detect motion around the vehicle parked at the home. Sensors on the car may also be able to detect or record a burglary in progress or other event occurring in view of the external cameras or sensors. The data may be transmitted to sensing system 256. In another embodiment, the operational sensors and the cameras and proximity sensors may store data within the vehicle, and/or may transmit the data to one or more external computer systems (e.g., a sensing system 300 in FIG. 3), as will be discussed more fully below.

The data transmitted to the sensing system 256 may be aggregated and some or all of the portions of the data may be used to identify and/or adjust insurance premiums or rates, provide insurance incentives, and/or provide discounts to the user. For instance, a user may be eligible for a discounted insurance premium if the user is willing to share the monitored or collected data with an entity, such as an insurance company. This data may then be used to modify or set insurance premiums or rates for the user (e.g., home insurance, vehicle insurance, and the like) and/or to more accurately assess risk associated with a user. Additionally or alternatively, the data collected may be aggregated with other data (e.g., historical data collected over an extended time period, other user monitored data, etc.) to further assess risk and/or set premiums or rates. The aggregated data may, in some examples, be sorted by locality (e.g., neighborhood, township, state, etc.) to assess risk by geographic location and set or adjust premiums or rates based on geographic location, as desired. In addition, various other additional outside data sources may also be collected and utilized. Such sources of data may include police reports, alarm companies, governmental agencies, etc.

In an embodiment, portions of the data may also be shared with other homes in the same neighborhood. For instance, FIG. 2B illustrates additional homes 262 and 272 which along with home 252 may comprise homes in a common neighborhood. The neighborhood may be defined by a number of particular streets or addresses or even by zip codes. Homes located within the same neighborhood may share information in order to notify each other of present events. For example, if home 250 determines based on the sensor data that a burglary may be ongoing, a message may be transmitted to home 262 and home 272 to alert them to the potential danger and to have them take preventive measures such as turning on all exterior lights. In an embodiment, homes willing to share such data with an entity and with other homes may be eligible for discounted insurance premiums or other incentives.

FIG. 2B further illustrates an additional vehicle 280 which may also be associated with a particular home such as home 272. Vehicle 280 similar to vehicle 260 may transmit information to a base collection unit 254 or directly to a sensing system 256, such as a sensing system used by an entity (e.g., an insurance company or provider). Vehicle data 280 along with home data 272 and 262 may be used or aggregated to determine or adjust the insurance premiums or rates of the individual homes. In another embodiment, vehicle data 280 along with home data 272 and 262 may be used or aggregated to determine a neighborhood risk profile to be applied to the insurance premiums or rates of multiple homes within a neighborhood.

Figure 3:
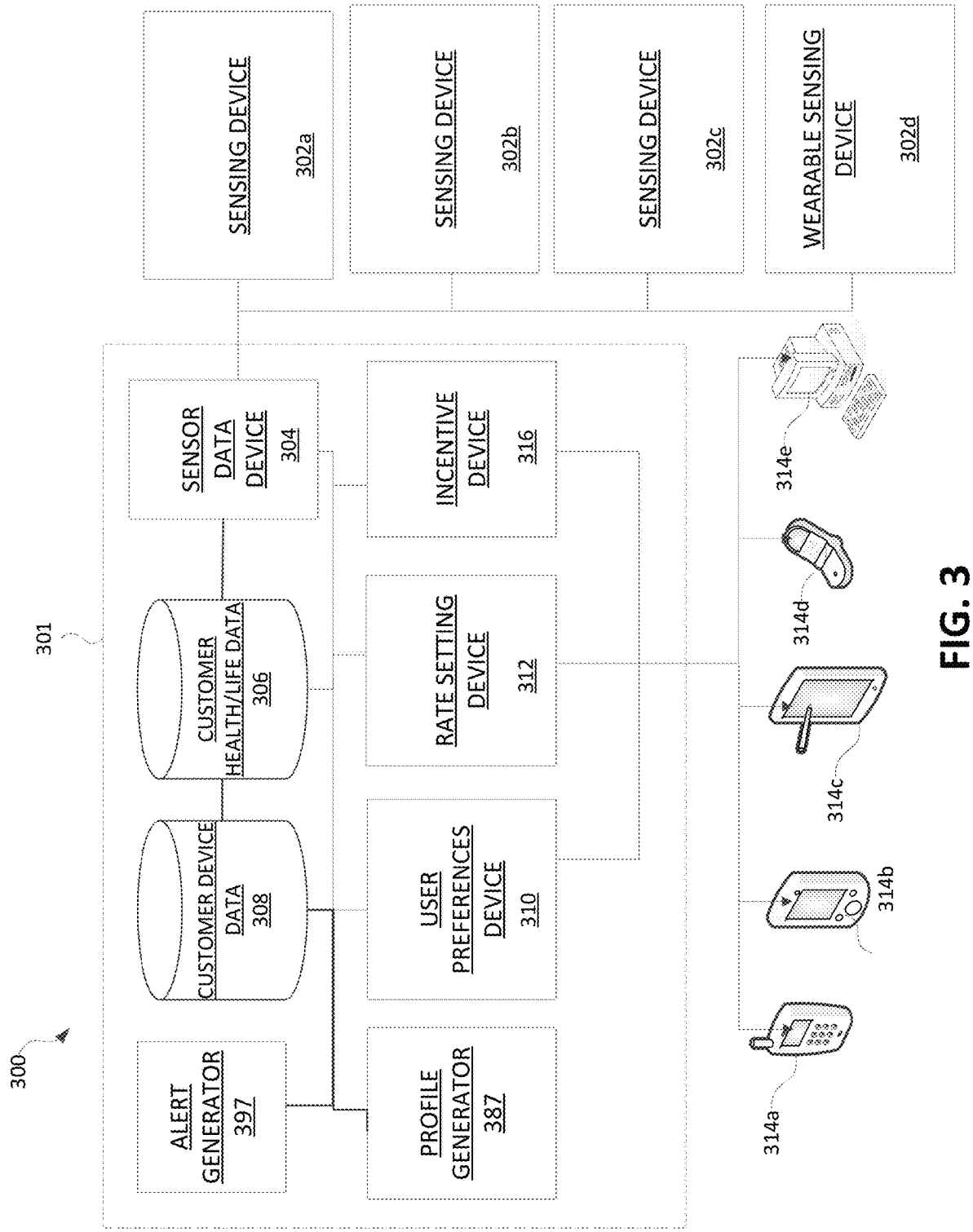
FIG. 3 is an example data collection system according to one or more aspects described herein.

FIG. 3 illustrates one exemplary sensing system 300. Each component of sensing system 300 may include a computing device (or system) having some or all of the structural components described above for computing device 101. In some arrangements, some or all of the components of system 300 may be housed in a single physical device. Alternatively, some or all of the components may be housed in separate physical devices.

Sensing system 300 may be associated with an entity 301. For instance, system 300 may be implemented by an entity 301, such as an insurance company. In other examples, system 300 may be implemented by various other types of companies, universities, government entities, and the like. Several examples discussed herein will be described in the context of an insurance company. However, nothing in the disclosure should be viewed as limiting the systems, methods, computer-readable media, and the like, described herein to use with insurance companies.

Sensing system 300 may include a plurality of sensing devices 302a-302d. Sensing devices 302a-302d may be a variety of types of devices and may be used to monitor or sense one or more characteristics of a home device, such as an appliance, system, etc., vehicle, and the like. For instance, sensing devices 302a-302c may include power sensors, float switches, moisture sensors, power sensors or monitors, wear indicating devices, speed sensors, and the like. In other examples, sensing devices 302a-302c may include devices for sensing temperature, sewage backup, natural gas, propane, etc., air quality (e.g., carbon monoxide, etc.), air flow quality, water flow, and the like. Various other types of sensing devices and/or characteristics may be monitored via sensing devices 302a-302c. In another embodiment, sensing device 302d may be a wearable device such as a watch. Other wearable devices which may be worn around an arm ankle, neck, or the like are also envisioned.

In some arrangements, one or more of sensing devices 302a-302c may be connected to or in communication with one or more home devices, such as appliances, systems, etc., to monitor one or more characteristics of the home device. For instance, home devices or systems such as a water heater, sump pump, roof, attic (e.g., air flow in attic), washing machine, dryer, refrigerator, freezer, air conditioner, furnace, and the like, may be monitored. Various other appliances and/or systems may be monitored without departing from the invention.

In some examples, one or more of sensing devices 302a-302c may be connected to or in communication with systems of a vehicle. For instance, one or more of the sensing devices 302a-302c may be configured to detect ambient conditions or weather events when the vehicle is parked such as in a home driveway. In addition, vehicle sensing devices may detect motion around a parked vehicle at a home. The data may be transmitted to sensing system 256. In another embodiment, the sensing devices may store data within the vehicle, and/or may transmit the data to one or more external computer systems as will be discussed more fully below.

Although sensing system 300 includes three sensing devices 302a-302c, system 300 may include more or fewer sensing devices without departing from the invention. Further, in some examples, each sensing device may be a different type of device and/or may be configured to monitor different characteristics of the home device (e.g., sensing device 302a detects moisture while sensing device 302b detects power consumption) or vehicle. Additionally or alternatively, each sensing device 302a-302c may be connected to or in communication with a different home device or vehicle, or multiple sensing devices 302a-302b may be connected to or in communication with a single home device or vehicle such that multiple, different characteristics of the home device or vehicle are being monitored (e.g., simultaneously). This may permit additional and/or more accurate information to be collected about the home device. Various combinations of the above-described arrangements may also be used without departing from the invention.

Signals and/or data from the sensing devices 302a-302c may be received by sensing system 300. For instance, signals and/or data may be transmitted from sensing devices 302a-302c to system 300 via wired or wireless transmission. In some examples, data and/or signals may be transmitted to a base unit for collection prior to transmission to system 300 or entity 301 associated with the system. In other examples, data and/or signals may be transmitted directly from each sensor 302 to system 300 or entity 301.

Signals and/or data from the sensing devices 302a-302c may be received by a sensor data device 304. Sensor data device 304 may include one or more computing devices containing many or all of the hardware and/or software components of the computing device 101 in FIG. 1. Sensor data device 304 may include hardware, software and/or network components configured to receive and/or transmit information to and/or from various computing devices, devices, databases, sensors, and the like.

Sensor data device 304 may be configured to perform a set of functions within the sensing system 300. For instance, sensor data device 304 may collect data and/or signals received from one or more sensing devices 302a-302c and may include one or more algorithms which may be executed by one or more software applications running on generic or specialized hardware within sensing system 300 to determine whether data is within a predefined range. For instance, sensor data device 304 may identify signals or data that are outside a predefined range (e.g., a normal or typical operating range) and, responsive to determining that the data is outside the predefined range, transmit an alert to a user identifying the potential issue. In some examples, the predefined range may be set, such as by a system administrator. In other examples, the predefined range may be based on historical data of the user or similar devices being monitored. In some examples, the historical data may be stored in a database, such as customer device database 308, as will be discussed more fully below.

In some arrangements, sensor data device 304 may aggregate data received from sensing devices 302a-302c for later use, as will be discussed more fully below.

Data received from sensors 302a-302c may be stored in customer device database 308. Customer device database may be organized in any of several different manners. For example, a table in the customer device database 308 may include a listing of various users, home devices associated with each user, historical data of the home devices, current or recent weather data, historical weather data, vehicle and/or driving data of the users, geographic location of users, and the like.

In some examples, customer device database 308 may also include historical data collected from users without the use of sensors. For example, customer device database 308 may include information provided by users, such as information associated with appliances, vehicles, home systems, etc. For instance, upon purchase of an appliance (e.g., stove, refrigerator, water heater, etc.) a user may provide information regarding the manufacturer, model, serial number, year of purchase or manufacture, amount paid, etc. for the appliance. Accordingly, as users add information for each appliance, system or vehicle, a catalog of device information may be maintained by the customer device database 308. This catalog of information may be used to track the age of appliances, systems, vehicles, etc., determine or assess risk associated with those appliances, systems or vehicles, identify opportunities for improvement (e.g., energy efficiency improvement) and the like.

In some examples, a radio frequency identifier (RFID), quick response (QR) code, bar code, or other data element may be applied to the appliance, system or vehicle to simplify tracking and/or identification of the appliance. For instance, if a repair is made to an appliance, the repair information may be provided to the system and may be input to the system by scanning the QR code, bar code, etc. and updating the information associated with that appliance, system or vehicle.

The information stored in customer device database 308 may also be used to alert users of recalls associated with one or more appliances, systems or vehicles within the system. For instance, recall information may be transmitted to the system 300 and the system may identify any devices matching the recall information. Accordingly, an alert may be transmitted to the user associated with that device. In another embodiment, an alert may include coaching or best practice information. For example, an alert may be issued which states that "most people in your area have replaced their furnace filter this year. A filter replacement may improve your homes energy efficiency by 20%". Another alert may provide energy efficiency tips for the home owner such as "Leaving your computer on during periods of inactivity during the day is your leading energy usage while you are gone. You may save money if you turn it off while away."

In still other examples, customer device database 308 may include historical customer information gathered from clients without the use of sensors. For instance, historical data from customers regarding incidents or damage to the home, appliances, system, vehicle, etc. may be obtained, such as from previous insurance claim information, and stored to further aid in assessing risk and setting or adjusting insurance rates or premiums.

Sensing system 300 may further include customer health/life data 306. Customer health/life data may be received from the customer or user and may include information regarding the general health and/or lifestyle of the user. For instance, it may include healthy eating habits of the user, exercise habits of the user, general wellness information (e.g., whether the user visits the doctor on at least an annual basis, etc.). The information may be received by the system via one or more computing devices, such as computing devices 314a-314e. For instance, a user may input health and/or life data via a smart phone 314a, personal digital assistant (PDA) 314b, tablet computer 314c, cell phone 314d or computer terminal 314e. Various other types of computing devices may be used without departing from the invention. In some examples, data may be stored in a mobile device application and transmitted from the application to the system 300. In still other examples, some data, such as exercise data, may be collected via one or more sensors (e.g., accelerometers, heart rate monitors, etc.) that are connected to the system. For instance, a user may have a device that monitors pace, speed, heart rate, and the like. This information may be uploaded from the user device to the system for use in determining and/or adjusting insurance rates or premiums, assessing risk associated with the user, and the like.

Sensing system 300 may further include customer transactional data. Customer transactional data may include merchandize or service type purchase information. For instance, transactional data may include home appliance purchases, home maintenance repairs, and/or automobile maintenance expenditures.

Sensing system 300 may further include a user preferences device 310. User preferences device 310 may be implemented in hardware and/or software configured to perform a set of functions within the sensing system 300. For instance, user preferences device 310 may receive and/or store one or more customer or user preferences associated with the sensing devices 302a-302c and/or the system in general. For example, a user may monitor one or more systems, appliances, vehicles, etc. However, the user may desire to only transmit a portion of the collected data to the system. Accordingly, a user may set up a user preference identifying the devices, appliances, systems and/or vehicles for which the system may monitor and/or receive data. Thus, a user may desire to only provide data associated with one or more home systems and not provide data associated with life or vehicle. In another example, a user may desire to provide all of the home device data, vehicle data and life data. Various other examples and combinations may be used without departing from the invention. In some examples, the entity may provide additional incentives, discounts, etc. based on the number of devices and/or data sets being received by the entity. For instance, if the user preferences indicate that all device data may be transmitted to the entity, that user may receive more incentives and/or discounts than a user provide only a portion of the collected data.

In an aspect of the disclosure, data may be filtered based on a user's predefined privacy settings. For instance, a particular user may wish to only share general data concerning their lifestyle for analysis. The general information shared may be arranged in categories for which a user may determine at what level each category of data is to be shared. In an embodiment, the user may select each device which may share data. In another embodiment, a data receiving device (such as a profile generator, discussed below) may filter the data based on a user's privacy or security settings.

Sensing system 300 may further include a profile generator 387. In an embodiment, the profile generator 387 may be a risk profile generator. The profile generator 387 may be implemented in hardware and/or software configured to perform a set of functions within the sensing system 300. For instance, profile generator 387 may analyze signals and/or data from the sensing devices 302a-302c that were stored in sensor data device 304. Profile generator 387 may determine normal operating conditions for a home based on analysis of the sensor data. Based on the determined normal operating conditions, profile generator 387 may determine a risk profile for the user.

In an embodiment, the determined risk profile may be used for determining an insurance premium rate for the home. In an aspect of the disclosure, the determined risk profile may be updated at some frequency by automatic review of new sensor data over a specified time period.

Sensing system 300 may further include a rate setting device 312. Rate setting device 312 may be implemented in hardware and/or software configured to perform a set of functions within the sensing system 300. For instance, rate setting device 312 may determine and/or adjust insurance rates or premiums based on the data collected by or stored within system 300. Rate setting device 312 may analyze the data to assess risk associated with one or more users, devices, geographic areas, etc. and may use that information to provide insurance adjustments or determine rates or premiums for users that may include customers or potential customers of the entity (e.g., the insurance company). In some examples, rate setting device 312 may be in communication with or connected to other systems associated with the entity to aid in assessing risk, determining rates, etc.

Sensing system 300 may further include an incentive device 316. Incentive device 316 may be implemented in hardware and/or software configured to perform a set of functions within the sensing system 300. For instance, incentive device 316 may identify one or more rebates, discounts, incentives, etc. to provide to a user based on the data collected by or stored within the system 300. For instance, if the collected data indicates that a water heater is likely to fail (e.g., based on an age of the water heater, detected corrosion within the water heater, etc.) the system may generate an incentive for the user to replace the water heater. For instance, the system may identify a 5% discount on home owners insurance for the user if the water heater is replaced within a predetermined period of time.

Sensing system 300 may further include an alert generator 397. Alert generator 397 may be implemented in hardware and/or software configured to perform a set of functions within sensing system 300. For instance, alert generator 397 may transmit messages to other homes or entities giving details of any abnormal operating conditions or events happening in a particular home. Such messages may enable receiving homes of the alerts to take preventive action to prevent the event from effecting additional homes.

In another aspect of the disclosure, the alert generator 397 may transmit predictive messages based upon detected abnormal operating conditions. For instance, a message regarding the detected abnormal condition may be sent to the user such as "your dryer is running hot, damage may occur, check filter."

Figure 4:
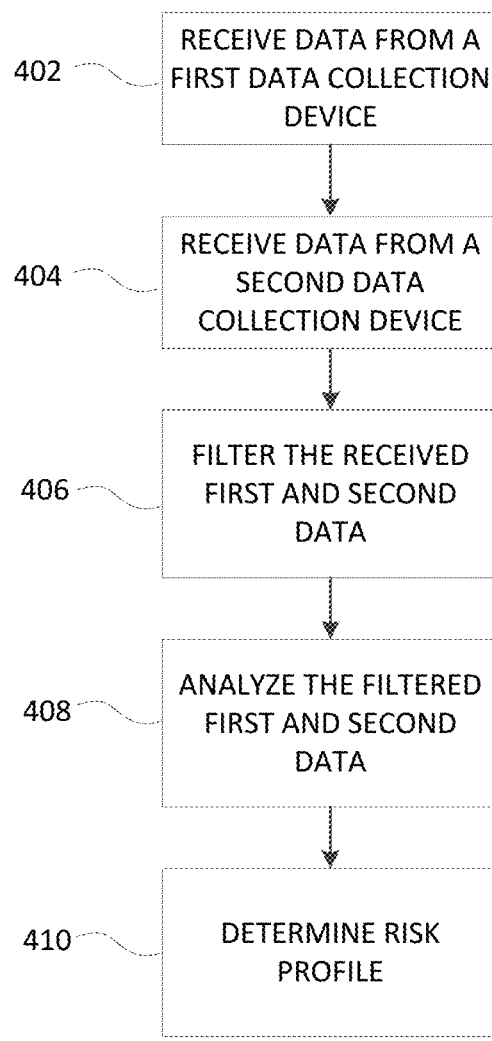
FIG. 4 is a flow chart illustrating one example method of implementing a data collection system according to one or more aspects described herein.

FIG. 4 illustrates one example method of implementing a data collection system for determining insurance premium rates according to one or more aspects described herein. In step 402, data may be received from a first data collection device. The first data collection device may receive numerous signals from one or more sensors from a first home. For instance, data may be received from a plurality of sensors associated with one home device or from sensors associated with a plurality of home devices in the first home.

In step 404, data may be received from a second data collection device. In an embodiment, data may be received from numerous signals from one or more sensors associated with a plurality of home devices located in a second home. In step 406, data received from the first and second data collection devices may be filtered based on privacy settings.

In step 408, the filtered data may be analyzed. The analysis may include extracting information that may be used to determine whether the plurality of sensors monitoring the various home devices in the first and second homes indicate that each of the homes is operating under normal operating conditions. The analysis may be completed for each home separately or at the same time at a central sensing unit.

In an embodiment, normal operating conditions may denote that all monitored devices in a home are operating correctly with no warnings or within predefined thresholds. As the devices may be monitored for longs periods, historical information may be used to determine trends in a home so as to recognize normal outputs or setting for the monitored devices in that particular home. For instance, the temperature of a home may be maintained in a range between 68-72 degrees Fahrenheit throughout a particular time of year. Operating within the 68-72 degrees Fahrenheit temperature range for a first home may indicate a normal operation condition of that first home. However, if the temperature of the first home is altered or changed such that the home is maintained at 60 degrees Fahrenheit for a predetermined period of time it may indicate that the first home is operating in an abnormal operating condition which may indicate that a problem has occurred with the heating unit or that the owner is not currently occupying the home (i.e. on vacation etc.). The temperature information may be combined with other sensor data to determine an overall normal operating condition for the particular home.

If abnormal operating conditions are detected in the home, a notification may be transmitted to the home owner or user via email, phone, SMS, and the like. The notification may be sent to a computing device of the user, such as a mobile device or user interface arranged in a vehicle.

The received sensor information for each home along with any stored historical data for each home may be analyzed to determine normal operating conditions for each of the first, second, and third homes.

In step 410, a risk profile may be determined based on the filtered and analyzed data. In step 412, based on the determined risk profiles (and, in some instances, other data) an insurance premium rate may be determined.

Figure 5:
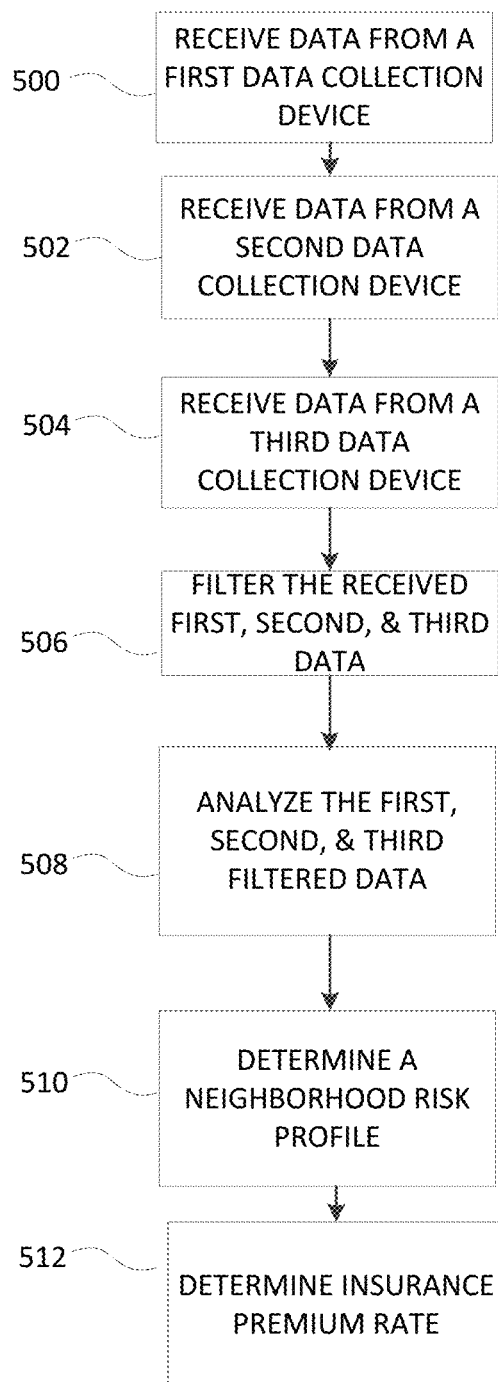
FIG. 5 is a flow chart illustrating another example method of implementing a data collection system according to one or more aspects described herein.

FIG. 5 illustrates another example implementation of a data collection system for determining insurance premium rates according to one or more aspects described herein. In step 502, data may be received from a first data collection device. The data may be received from multiple sensors and/or multiple devices associated with a first home located in a particular geographical location. For instance, data may be received from a first home device which may include one of a water heater, refrigerator, furnace, washing machine, dryer, and dishwasher.

In step 504, data may be received from a second data collection device. The data may be received from multiple sensors and/or multiple devices associated with a second home located in the same geographical location as the first home. In an embodiment, data may be received from a second home device which may include one of a light switch, roof monitor, smoke detector, sump pump, and home security system.

In step 506, data may be received from a third data collection device. The data may be received from multiple sensors and/or multiple devices associated with a third home located in the same geographical location as the first and second home.

In step 508, the filtered data may be analyzed. The analysis may include extracting information that may be used to determine whether the plurality of sensors monitoring the various home devices in the first, second, and third homes indicate that each of the homes is operating under normal operating conditions. The analysis may be completed for each home separately or at the same time at a central sensing unit.

In an embodiment, normal operating conditions may denote that all monitored devices in a home are operating correctly with no warnings or within predefined thresholds. As the devices may be monitored for longs periods, historical information may be used to determine trends in a home so as to recognize normal outputs or setting for the monitored devices in that particular home. If abnormal operating conditions are detected in the home, a notification may be transmitted to the home owner or user via email, phone, SMS, and the like. The notification may be sent to a computing device of the user, such as a mobile device or user interface arranged in a vehicle.

The received sensor information for each home along with any stored historical data for each home may be analyzed to determine normal operating conditions for each of the first, second, and third homes.

In step 510, a neighborhood risk profile may be determined based on the filtered and analyzed data. In step 512, based on the determined neighborhood risk profiles (and, in some instances, other data) an insurance premium rate may be determined for each of the first, second, and third homes.

In an embodiment, a neighborhood risk profile may be determined based on an aggregation of risk profiles found in a particular area such as risk profiles found in a particular zip code or other geographical boundary. In one embodiment, a neighborhood risk profile may be determined on a street by street basis for various neighborhoods.

In another embodiment, a neighborhood risk profile may be applied to each of the peril categories to determine an insurance premium rate for a neighborhood. The neighborhood risk profile may be used to more accurately assess risk associated with a home and may be used to adjust or determine an insurance rate or premium based on this assessed risk. In some arrangements, the users may be notified of the potential rate or adjustment prior to the rate or adjustment taking effect. The user may then have an opportunity to take action in order to further adjust the rate.

In an embodiment, normal operating conditions may denote that all monitored devices in the home are operating correctly with no warnings or within predefined thresholds. As the devices may be monitored for longs periods, historical information may be used to determine trends in a home so as to recognize normal use of monitored devices in that particular home. For instance, rain detected by a roof or shingle monitor may indicate a normal operating condition for a home. However, hail as indicated or detected by a roof or shingle monitor (i.e. pressure sensor) may indicate an abnormal operating condition for the home (step 606). If abnormal operating conditions are detected, a notification may also be transmitted to the home owner or user via email, phone, SMS, and the like. The notification may be sent to a computing device of the user, such as a mobile device or user interface arranged in a vehicle.

Provided below are various example arrangements of the sensing systems described herein and one or more implementations of such systems. The arrangements described below are merely some examples of systems and implementations, and nothing in the examples should be construed as limiting the invention to only those examples. Rather, various other systems and implementations may be used without departing from the invention.

In one example, data may be received from one or more sensors in communication with or connected to a water line on a refrigerator. In some examples, the sensors may monitor the condition of the water line to determine an approximate age or likelihood of failure of the water line. For instance, a sensor may monitor an amount of flow through a water line (e.g., reduced flow may indicate buildup in the water line which may indicate an age of the water line or likelihood of failure). In another example, a sensor may monitor the flexibility or brittleness of the water line to determine whether the water line material has deteriorated, thus increasing a likelihood of failure. Sensors may transmit this data to the system for analysis and/or aggregation with other types of data to determine a likelihood of failure and/or an insurance rate. In some examples, the user may be offered a rebate, lower insurance rate, or other incentive to replace the water line prior to failure in order to avoid the failure.

Various other sensing arrangements of one or more appliances, systems, etc. may be used without departing from the invention.

The systems described herein provide various advantages. For instance, monitoring of one or more home devices, vehicle or driving characteristics and/or health or lifestyle information may aid in identifying potential issues. For instance, monitoring of various systems, etc. may provide an early warning of a potential failure or early warning of an actual failure. For instance, the monitoring system may detect moisture in a home (e.g., a broken pipe, etc.) in which the home owners are away. In some examples, the system may alert the home owner who may then have someone shut off the water in order to minimize the damage. In another example, a moisture sensor may detect a small amount of moisture and alert the user before the user would have detected the moisture himself. These early warning systems may reduce or eliminate damage.

Further, monitoring of various driving characteristics or health/lifestyle characteristics may raise awareness. For instance, a user may be unaware that he or she tends to exceed the speed limit when driving. In another example, a user may be unaware that he or she uses his or her mobile device while driving as often as he or she does. Accordingly, monitoring these aspects and notifying the user of the characteristics may raise awareness and cause the user to make safer or healthier decisions.

Further still, the systems described herein may be used with a variety of sensors or sensing devices. In some examples, the user may be able to install the sensors themselves without any additional assistance. Some sensors may be relatively inexpensive which may be another incentive for users to install one or more sensors or monitoring devices.

In addition, a user may select or determine the data that is made available to any entity (e.g., an insurance company) implementing the system. Accordingly, if a user desires to have the data collected in order to monitor his or her home, vehicle, lifestyle, etc. without providing the data to any outside entity, he or she may do so. In another example, a user may choose to provide a portion of the collected data to the entity. The entity may then provide increasing incentives for users who provide more information (e.g., the more data provided to the entity, the greater the incentive or benefit to the user from the entity).

The systems, apparatuses, computer-readable media and methods described above may further provide for increased accuracy in identifying risk associated with a home, user, etc. Accordingly, one or more insurance rates, premiums, and the like, may be adjusted based on this more accurate risk.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A device, comprising:
  a sensing system coupled to a network wherein the sensing system is in communication with a plurality of different data collection devices located at a geographical location;
  a processor coupled to the network; and
  a memory storing computer-executable instructions, which when executed by the processor, cause the sensing system to:
    receive at least one signal via the network having first data from a first data collection device;
    receive at least one signal via the network having second data from a second data collection device,
    filter the received first and second data based on privacy settings to obtain filtered first and second filtered data;
    analyze the filtered first and second data;
    determine a risk profile based on the analyzed and filtered first and second data;
    determine an insurance premium rate based on the determined risk profile;
    further analyzing the filtered first and second data to determine normal and abnormal operating conditions of the geographical location; and
    automatically initiate an insurance claim based on the determined abnormal operating conditions of the geographical location.

2. The device of claim 1, wherein the first data collection device is one of a: water heater, refrigerator, furnace, washing machine, dryer, and dishwasher.

3. The device of claim 2, further including instructions that, when executed, causing the device to create a notification of required maintenance for the first data collection device.

4. The device of claim 1, wherein the second data collection device is one of a: light switch, roof monitor, smoke detector, sump pump, and security system.

5. The device of claim 1, wherein the sensing system is also cause to:
  receive at least one signal via the network having third data from an outside source of data;
  filter the received first, second, and third data based on privacy settings to obtain filtered first, second, and third filtered data;
  analyze the filtered first, second, and third data;
  determine a risk profile based on the analyzed and filtered first, second, and third data; and
  based on the determined risk profile, determine an insurance premium rate.

6. The device of claim 5, wherein the outside data source is one of a:
  police report, neighborhood report, alarm company, or vehicle.

7. The device of claim 1, further including instructions that, when executed, cause the device to create a notification of the determined abnormal operation conditions of the geographical location.

8. A method, comprising:
  receiving at least one signal having first data via a network from a first sensing system, wherein the first sensing system comprises a first plurality of different data collection devices located at a first geographical location;
  receiving at least one signal having second data via a network from a second sensing system, wherein the second sensing system comprises a second plurality of different data collection devices located at a second geographical location;
  filtering the received first and second data based on privacy settings;
  analyzing the filtered first and second data;
  determining a first risk profile and second risk profile based on the filtered and analyzed first and second data;
  determining a first insurance premium rate based on the first risk profile;
  determining a second insurance premium rate based on the second risk profile;
  determining abnormal and normal operating conditions at each geographical location based on the analyzed and filtered first and second data; and
  automatically initiating an insurance claim based on the determined abnormal operating conditions of each geographical location.

9. The method of claim 8, further comprising
  receiving at least one signal having third data via a network from an outside source of data;
  filtering the received first, second, and third data based on privacy settings;
  analyzing the filtered first, second, and third data;
  determining a third risk profile based on the analyzed and filtered first, second, and third data; and
  determining a third insurance premium rate based on the determined third risk profile.

10. The method of claim 9, wherein the outside data source is one of a: police report, neighborhood report, alarm company, or vehicle.

11. The method of claim 8, further compromising notifying safety personal of determined abnormal operating conditions of each geographic location.

12. The method of claim 8, further comprising creating a notification for each geographic location of required maintenance for the data collection devices.

13. The method of claim 8, wherein the first plurality of different data collection devices includes a vehicle.

14. The method of claim 8, wherein the first plurality of different data collection devices includes a mobile phone.

15. A method, comprising:
receiving at least one signal having first data via a network from a first sensing system, wherein the first sensing system comprises a first plurality of different data collection devices located at a first geographical location;
receiving at least one signal having second data via the network from a second sensing system, wherein the second sensing system comprises a second plurality of different data collection devices located at a second geographical location;
receiving at least one signal having third data via the network from a third sensing system, wherein the third sensing system comprises a first plurality of different data collection devices located at a third geographical location;
filtering the received first, second, and third data based on privacy settings associated with the first, second, and third sensing systems;
analyzing the filtered first, second, and third data;
determining a risk profile based on the filtered and analyzed first, second, and third data;
determining, based at least in part on the determined risk profile, an insurance premium rate for each geographical location;
determining abnormal and normal operating conditions at each geographical location based on the analyzed and filtered first, second, and third data; and
automatically initiating an insurance claim based on the determined abnormal operating conditions of each geographical location.

16. The method of claim 15, further comprising
receiving at least one signal having fourth data via a network from an outside source of data;
filtering the received first, second, third, and fourth data based on privacy settings based on privacy settings associated with the first, second, third, and fourth sensing systems data collection devices;
analyzing the filtered first, second, third, and fourth data;
determining a second risk profile based on the filtered and analyzed first, second, third, and fourth data; and
determining an insurance premium rate for each geographical location based on the second risk profile.

17. The method of claim 15, wherein the outside data source is one of a: police report, neighborhood report, alarm company, or vehicle.

18. The method of claim 15, further compromising notifying safety personal of determined abnormal operating conditions of each geographic location.

19. The method of claim 15, further comprising creating a notification for each geographic location of required maintenance for the data collection devices.

20. The method of claim 15, wherein each plurality of different data collection devices includes a vehicle.

21. The method of claim 15, wherein each plurality of different data collection devices includes a mobile phone.

* * * * *